United States Patent Office 2,790,781
Patented Apr. 30, 1957

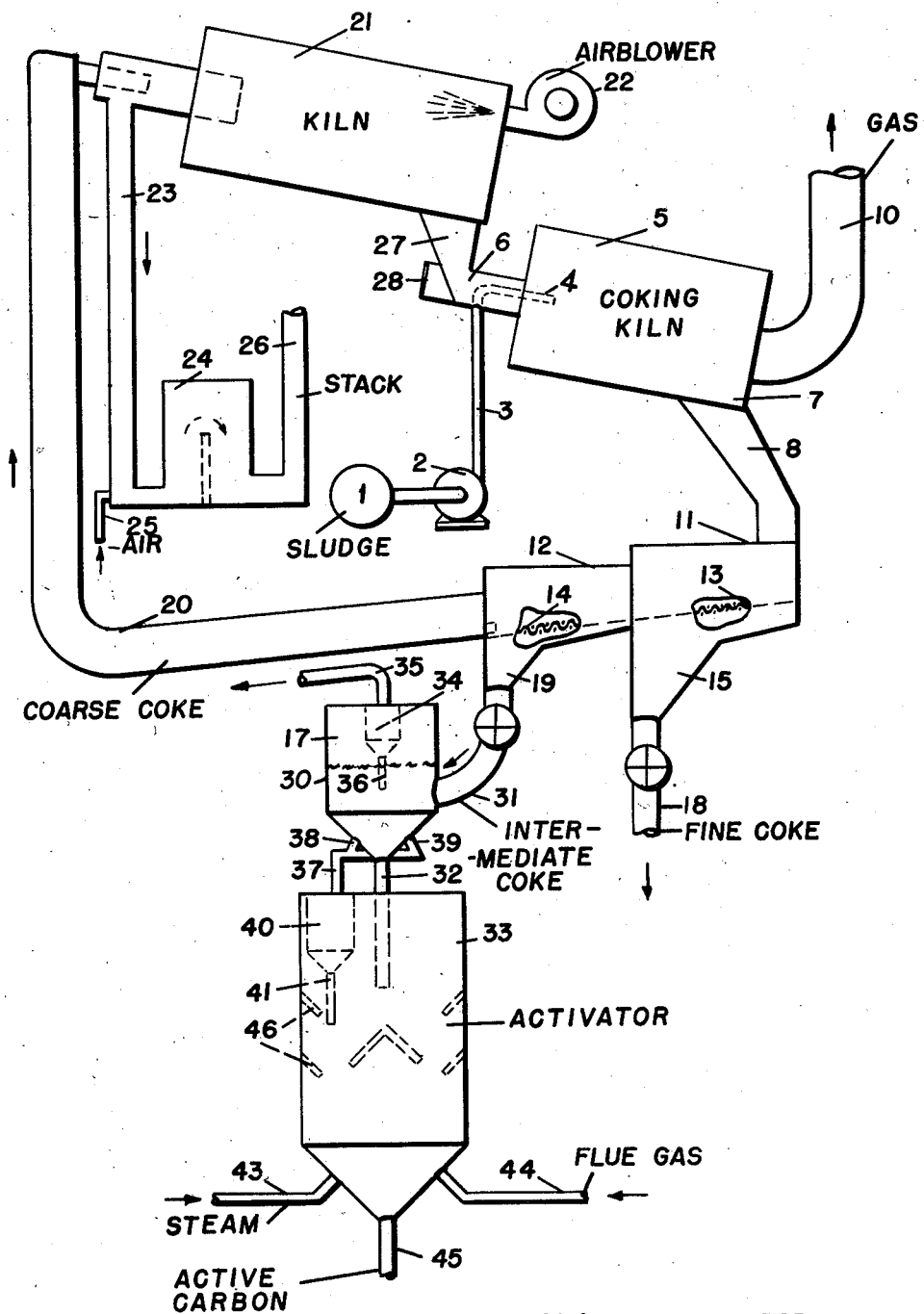

2,790,781

PRODUCTION OF ACTIVATED COKE FROM PETROLEUM ACID SLUDGE COKE

James E. Moise, Baton Rouge, La., assignor to Esso Research and Engineering Company, a corporation of Delaware Application May 11, 1953, Serial No. 353,955

4 Claims. (Cl. 252—421)

The present invention is concerned with preparation of highly activated char useful as a selective hydrocarbon gas adsorbent by treatments of petroleum acid sludge coke.

Considerable progress has now been made in preparing activated char from petroleum acid sludge coke based on the discovery of how it is best to control the particle size of the coke subjected to high temperature activation in the presence of activating gases such as steam and carbon dioxide and to avoid grinding of the coke prior to activation.

Operations of a fluidized solids reactor for the production of activated char from acid sludge coke showed that the regular fluid grade (fine) particles gave difficulties in high entrainment, high losses of coke, and unsatisfactory treatment of the coke.

Activation treatments of ground coke which contained about 15 or more weight percent of fines smaller than 80 mesh openings (0.175 mm.) were generally poor. High losses were experienced in char loss through filters and the filter materials deteriorated rapidly. High temperatures at the filters showed that the entrainment of fine char in the gases was quite high even at relatively low bed temperatures. As the bed temperatures were raised to above 1300° F. (700° C.) at which point activation of carbon by steam proceeds at an appreciable rate, the entrainment was even greater. Grinding of the coke causes formation of large amounts of fines that pass through an 80 and even a 200 mesh screen.

In accordance with the present invention, a suitable coke particle size is prepared, classified and used for the activation without grinding. During the coke preparation, efforts can be made not only to control the size of particles mainly produced, but also to control the sulfur and volatile matter content of the coke.

The procedural steps of the present invention may be employed with rotary kilns, classifying, conveying, and fluidized solids treating apparatus adapted for the steps described. In moving the suspension of coke particles through the coking zone, petroleum acid sludge should be deposited onto the coke introduced at one end of the zone and the sludge-coated coke should be moved quickly and continuously toward a cooler discharge end of the sludge coking zone for removal therefrom.

In the attached drawing is illustrated a flow plan of steps and means for coking acid sludge and activating a selected coke product.

The petroleum acid sludge is pumped from a tank 1 by pump 2 through feed line 3 to be sprayed by nozzle 4 into an inlet end of rotary kiln 5.

Kiln 5 is where the acid sludge is decomposed as it forms a coating on recycled hot coke particles in a few seconds. In this sludge decomposition the acid sludge, which may be preheated, forms a coke coating quickly on the hot carbon particles entering from inlet 6 at a temperature of 400° C. to 650° C. (750° F. to 1200° F.).

At the outlet end 7 of kiln 5 the acid sludge coating is carbonized on the recycled hot carbon or hot coke particles. Here the coke particles become cooled to 100° C. to 350° C. (212° F. to 660° F.) and are dropped into a removal means such as chamber 8. Volatile materials including water vapor and sulfur-containing compounds, e. g. sulfur vapor, sulfur dioxide and sulfur trioxide are removed at this outlet end 7 of kiln 5 up through flue 10, whence they may be passed to a sulfuric acid recovery unit (not shown).

The coked acid sludge particles can be made to vary considerably in size. Variation in size takes place with changes in the size and amounts of the coke particles which are recycled to be recoated by decomposed sludge in zone 5. Also, variations in the size of the coke particle products will take place with changes in the composition of the recycled particles, proportions of sludge coked on the particle, and extent of coking in zone 5.

For obtaining a desired uiformity of size and the proper grade of size for activation, the coked particles are discharged from chamber 8 and are passed into a classifying system represented by screening chamber 11 and 12. A number of such chambers equipped with vibrating screens 13 and 14 may be used. With the classifying system shown, a fine screen 13 of about 80 mesh allows the finest particles to be shaken through and collected in hopper 15. A high proportion of the finest particles is discharged through pipe 18 as extra fine coke unsuitable for activation. The Tyler Standard Screen-Scale Sieves are used as a basis for the mesh sizes.

In chamber 12, the major part of coke particles should pass through screen 14 which is of about 10 to 14 mesh. The intermediate size particles which pass through screen 14 are collected in hopper 19 and are allowed to flow downwardly into the coke product hopper 17. These intermediate particles should constitute about 50 to 70% of the total unground coke product which is subjected to the screening. The coarsest particles which are retained on screen 14 may be conveyed by a suitable conveying means 20 back into the inlet of coke combustion and heating kiln 21. The conveying means may be a moving belt, moving bucket, or means equipped for fluidization of the coke particles.

Kiln 21 has a hot air blower 22 near its outlet end. The hot air is blown countercurrent to the flow of coke in kiln 21 to cause partial combustion of the coke particles. Any very fine particles present in kiln 21 are burned completely. The air supplied to kiln 21 is controlled to bring the coke to a temperature in the range of about 400° C. to 650° C. (750° F. − 1200° F.). The kiln may be equipped with other heating means not shown, e. g. external heating means or with means supplying other combustion gases. The gaseous products of combustion are swept out of the upper end of kiln 21, which is the end being charged with coke particles, to be removed through duct 23 to an afterburning combustion chamber 24 where combustion is completed by addition of air from line 25. Flue gases are removed from combustion chamber 24 through the stack 26.

The heated coke leaves the lower end of kiln 21 through passage 27 at a temperature in the range of 400° to 650° C. and is discharged through passage 27 into chamber 6. Chamber 6 is equipped with means, such as vibrator 28, for displacing the hot coke particles into the inlet end of the sludge decomposing zone in kiln 5, where the cycle described is again started.

The acid sludges to be coked are residual products of various petroleum refining operations, e. g. sulfuric acid treatment of gasoline or higher-boiling distillates, and mainly from sulfuric acid or oleum treatment of phenol extracted oils in the lubricating oil range for the manufacture of white oils and petroleum sulfonates. These acid sludges may vary in character depending upon the variety of the acid treatments, but, in general, these sludges are settled to remove any aqueous acid which separates from a thick tarry residue known as the acid sludge. This sludge is a heterogeneous mixture of carbonaceous materials including sulfuric acid and sulfur derivatives.

The tarry acid sludge is carbonized in kiln 5 on being contacted with hot coke particles by supplying thereto the temperatures of about 400° C.–650° C. (750° F.–1200° F.). As the coated particles are moved toward the discharge end 7, they become cooled to a temperature of about 100° C. to 350° C. (212° F. to 660° F.). The decomposition of the sludge coating to the extent that the residual sludge coke has a volatile matter content of about 10 to 25 weight percent (measured at 1000° F.) takes less than 10 to 20 minutes under the conditions specified.

The screened and classified intermediate coke particles of about 14 to 80 mesh size (1/16 inch to 175 microns in diameter) such as passed through screen 14 and collected in receiver 17 gave little difficulty in handling through a system which was designed for a much finer powder. This material was fed satisfactorily into a head tank 30 as shown by line 31 and was satisfactorily fed from this head tank through drawoff line 32 into the activator vessel 33. A gas separator 34 in head tank 30 permitted escape of gases through outlet 35 with a dip leg 36 return for the solids. Hot gases from the activator were injected through lines 37, 38, and 39 into the head tank to keep the char fluidized. A gas velocity of only about 0.2 ft. per second was sufficient to maintain fluidization.

The hot exit gases are removed from the activating vessel 33 through the separator 40 and line 37. The separated solids are returned by dip leg 41 into the bed of fluidized char undergoing activation.

Superheated steam is injected at the bottom part of activator 33 through line 43. Hot flue gases containing mostly carbon dioxide, nitrogen, and water vapor are injected directly from line 44 at a temperature of 900° to 1100° C. Additional heat could be added by indirect heat exchange tubes with circulating hot fluids passed through the heat exchange tubes placed inside the activator vessel 33. The coke becomes activated in a period of about 10 minutes losing 40 to 60% carbon content. The activated char is withdrawn from the bottom of vessel 33 through line 45 for cooling and storage.

From the standpoint of operability, the tests using relatively coarse coke were very successful. Some slugging was experienced in the reactivator from some coarse coke, but it was indicated that baffles, such as the baffles 46 in the vessel 33, would be helpful in reducing any uneven fluidization and for reducing short-circuiting in the treatment of the char.

Tests indicated that activation of the relatively coarse coke could be carried out advantageously at relatively low pressures, such as 75 p. s. i. g. or preferably 0 p. s. i. g. while using relatively high steam velocities.

In carrying out the activation of ground coke or coke containing above 15% of fines, i. e., finer than 80 mesh, it was found that the high entrainment and large losses of coke made it necessary to reduce the steam velocities to about 0.3 ft. per second. The magnitude of losses in using above 0.3 ft. of steam per second is shown in the following summary table:

*Table I*

Conditions:
- Pressure, p. s. i. g _____ 75
- Temperature, ° F _____ 1550 (843° C.)
- Steam velocity ft./sec _____ 0.35
- Bed holdup, lb _____ 16
- Coke feed, lb./day _____ 845
- Coke withdrawn, lb./day _____ 410
- Carbon burned, lb./day _____ 120–200
- Losses through filters, lb./day _____ 235–350
- Ethylene activity, percent _____ 84
- Propane activity, percent _____ 75

The activity is expressed as a percent compared to the adsorption capacity of a commercial activated coconut char.

A comparison of the operation on the relatively coarse coke and the ground coke containing fines at 75 p. s. i. g. is shown in the following table:

*Table II*

|  | Ground Coke | Unground Coke [1] |
| --- | --- | --- |
| Temperature, °F | 1,570 (854° C.) | 1,570 (854° C.) |
| Pressure, p. s. i. g | 75 | 75 |
| Steam Velocity, ft./sec | 0.3 | 0.9 |
| Bed Holdup, Lbs | 15–20 | 35 |
| Production Rate Activated Coke, lbs./hr | 20 | 24 |
| Ethylene Capacity, Percent | 84 | 88 |
| Propane Capacity, Percent | 77 | 95 |

[1] Rough size reduction to make all material pass through a 10 mesh screen.

The typical unground acid sludge cokes which gave superior yields of highly active carbons showed the following screen analyses after removing fines and coarse particles.

*Table III*

|  | Run Numbers | | | |
| --- | --- | --- | --- | --- |
|  | #16 | #8 | #18 | #6 |
| Retained on screen: | | | | |
| 14 mesh | 6 | 14 | 6 | 23 |
| 20 mesh | 22 | 28 | 16 | 46 |
| 35 mesh | 64 | 64 | 59 | 73 |
| 60 mesh | 85 | 85 | 87 | 88 |
| 80 mesh | 93 | 94 | 96 | 95 |
| Through 80 mesh | 7 | 6 | 4 | 5 |
| Activated Coke: activity— | | | | |
| Propane activity, percent | 107 | 106 | 112 | 111 |
| Yield, percent | 52 | 59 | 46 | 55 |

The foregoing data which were collected at less than 5 p. s. i. g. show that with at least 16 wt. percent of the coke retained on a 20 mesh screen and less than about 7% passing through an 80 mesh screen high activation and high yields are obtained. The superior results are shown for the coarser particles of which 28 wt. percent and higher were retained on a 20 mesh screen.

The principal factors of controlling the size of the particles produced in the coking zone from the sprayed coating of the acid sludge on the circulated coke particles include the following:

More uniform coating and coke layer build-up should be obtained in preparing the coke, and this is accomplished by spraying the suitably preheated acid sludge at about 150° C. to 350° C. onto relatively uniform size coke particles in the 14 to 80 mesh range preheated to 400° C. to 650° C. as they pass through a spraying area at the inlet of a coking zone in a limited period.

The sprayed coating of sludge is shock heated as it is deposited as a thin coating onto the high temperature coke particles passed through the spraying area and the coated particles are then cooled as they are passed through the remaining part of the coking zone to the outlet in about 10 to 20 minutes where they are discharged at temperatures of 100° C. to 350° C.

By the described coking procedure a large proportion of the coke product discharged unground from the coking zone falls into the desired intermediate particle size class of 14 to 80 mesh best adapted for activation. The coarser particles, which do not pass through a 14 mesh screen are separated and are adapted for recycling to the coke heating zone, wherein some of the coke is consumed. The very fine particles which pass through an 80 mesh screen are kept down in yield and are removed as unsuitable for the following activation.

The procedure of forming the coke and activating can be applied to activated carbon which requires reactivation and the reactivation may be carried out simultaneously with a recycling of the very coarse coke product separated before activation.

The highly active chars obtained in accordance with the present invention are inexpensive compared to other kinds of activated carbons.

The acid sludge cokes can be activated by treatment with steam or carbon dioxide in yields of 20 to 65 wt. percent at temperatures of 700° C. to 900° C. in short periods of about 60 minutes whereas petroleum cokes which are not acid sludge cokes can not.

It should be noted that in the activation of the coarse 10 to 80 mesh size particles to obtain a minimum burning of these particles to fines with the improvement in activity, the hot activating gases should be substantially free of molecular oxygen, air or free oxygen.

The method of activating has been shown to be particularly advantageous in conjunction with the preparation of activated carbon from petroleum acid sludge coke formed in the manner described, but it is advantageously adapted for activating coarse coke formed by other methods. In addition to the saving of grinding requirements, there is a lower loss of fines, and superior results in the hydrocarbon adsorption activity of the activated carbons from the coke particles which are relatively coarse or unground when subjected to activation in the manner described.

What is claimed is:

1. A process for preparing from petroleum acid sludge containing sulfuric acid and tars an activated carbon suitable for selective adsorption of ethylene and propane which comprises spraying said acid sludge at a temperature of about 150° to 350° C. onto hot coke particles entering a coking zone at a temperature of 400° C. to 650° C., coking the sludge sprayed on the coke particles as they pass through the coking zone less than 10 to 20 minutes, classifying resulting coke particles discharged from the coking zone prior to grinding to separate intermediate size particles from finer particles which pass through an 80 mesh screen and from coarse particles unable to pass through a 14 mesh screen, then passing the separated intermediate size particles kept unground down through an activating zone countercurrent to a stream of hot activating gas selected from the group consisting of steam and carbon dioxide at a temperature in the range of 700° C. to 900° C. until about 45 to 60% of the coke remains as carbon particles.

2. A process for preparing from petroleum acid sludge containing sulfuric acid and tars an activated carbon suitable for selective adsorption of ethylene and propane, which comprises heating coarse coke particles larger than 10 mesh screen size by partial combustion to a temperature of 400° C. to about 650° C. in a heating zone, passing the coke from said heating zone through a sludge spraying area within a coking zone, coating the coke at temperatures of 400° C. to about 650° C. with the petroleum acid sludge containing sulfuric acid and tars and decomposing the sludge coating on the coke in said coking zone, passing the coated coke from the spraying area through a remaining part of the coking zone wherein the coke is cooled to a discharge end thereof in less than 10 minutes, removing coke from said discharge end, separating fine particles smaller than 80 mesh and coarse particles larger than 10 mesh from intermediate size particles of said coke removed from the discharge end, recycling the coarse particles to said heating zone, and activating the intermediate particles with steam prior to any grinding but freed of the fine and coarse particles.

3. A process as described in claim 2, in which the hot coke particles supplied to the coking zone and discharged therefrom are mainly of a size capable of passing through a 10 mesh screen but which are retained on an 80 mesh screen.

4. A process for preparing from petroleum acid sludge containing sulfuric acid and tars an activated carbon suitable for selective adsorption of ethylene and propane, which comprises supplying to an inlet end of a coking zone hot coke particles at a temperature of 400° C. to about 650° C., spraying said petroleum acid sludge on the hot coke particles as they enter said coking zone wherein the sludge on the hot coke is quickly coked, moving the coke particles bearing a coked sludge coating through the coking zone toward a discharge end thereof in a period of less than 20 minutes, discharging the resulting coke particles bearing a coked sludge coating from the discharge end of said coking zone at a temperature in the range of 100° C. to 350° C., classifying resulting coke particles discharged from the discharge end of said coking zone prior to grinding to separate fine coke particles which pass through an 80 mesh screen from intermediate size particles which are unable to pass through an 80 mesh screen but which pass through a 10 mesh screen, separating said intermediate size particles from coarser particles which are unable to pass through a 10 mesh screen, and activating the thus separated intermediate size particles kept unground after their preparation and classification, said activation being carried out with an activating gas selected from the group consisting of steam and carbon dioxide at a temperature in the range of 700° to 900° C. until about 20 to 65% of the coke remains as activated carbon particles.

References Cited in the file of this patent

UNITED STATES PATENTS

| | | |
|---|---|---|
| 2,342,862 | Hemminger | Feb. 29, 1944 |
| 2,393,214 | Andrews | Jan. 15, 1946 |
| 2,405,206 | Goss et al. | Aug. 6, 1946 |
| 2,412,667 | Arveson | Dec. 17, 1946 |
| 2,448,337 | Wickenden | Aug. 31, 1948 |
| 2,586,889 | Vesterdal et al. | Feb. 26, 1952 |